(No Model.)

E. J. BLACKHAM.
DRAWER PULL.

No. 258,009. Patented May 16, 1882.

UNITED STATES PATENT OFFICE.

ELI J. BLACKHAM, OF BRIDGEPORT, ASSIGNOR TO THE BENEDICT & BURNHAM MANUFACTURING COMPANY, OF WATERBURY, CONN.

DRAWER-PULL.

SPECIFICATION forming part of Letters Patent No. 258,009, dated May 16, 1882.

Application filed April 15, 1882. (No model.)

*To all whom it may concern:*

Be it known that I, ELI J. BLACKHAM, of Bridgeport, in the county of Fairfield and State of Connecticut, have invented new Improvements in Drawer-Pulls; and I do hereby declare the following, when taken in connection with accompanying drawings and the letters of reference marked thereon, to be a full, clear, and exact description of the same, and which said drawings constitute part of this specification, and represent, in—

Figure 1:
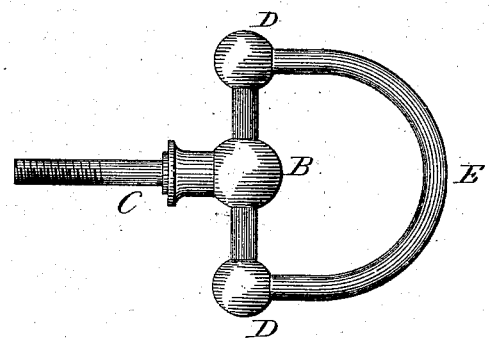
Figure 2:
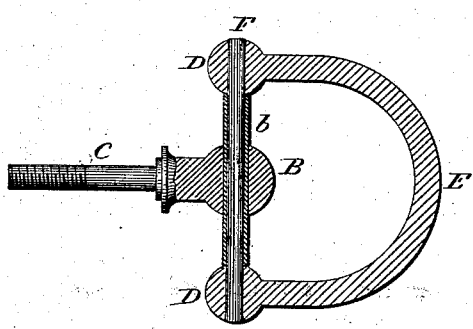
Figure 3:
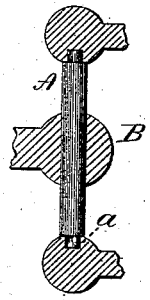

Figure 1, a perspective view; Fig. 2, a central section; Fig. 3, the previous construction.

This invention relates to an improvement in that class of drawer-pulls which are of U shape, and hinged in a socket, so as to swing down into vertical position when not in use, and raise into horizontal position when required to pull out the drawer.

In the usual construction, as seen in Fig. 3, a spindle, A, has been passed through the head B of the socket, and each end of the U-shaped handle has been constructed with a cavity, $a$, upon its inside, so as to be closed upon the ends of the spindle. A serious difficulty is experienced in this class of pulls, from the fact that a very light twisting strain will force the handle from the ends of the spindle.

The object of my invention is to overcome this difficulty; and it consists in the arrangement of a tube through the socket, against which the ends of the handle will abut, with a spindle extending through said tube and into the ends of the handle, and there secured, as more fully hereinafter described.

B represents the head of the socket, of usual form, it being fitted with a screw, C, or otherwise, for attachment to the drawer-front. Diametrically through the head a tube, $b$, is introduced and closely fitted or secured, so as to prevent its movement axially, the length of this tube corresponding to the distance between the two ends D D of the handle E.

Through the two ends of the handle and through the tube a wire spindle, F, is introduced and secured in the handle, so as to form a pintle within the tube, on which the handle will freely swing. The spindle is best secured by riveting its two ends, as seen in Fig. 2; but it may be otherwise secured; and, if preferred, the ends of the tube may enter slightly into the ends of the handle.

By this construction it is impossible to separate the handle from the socket by any strain or power which can be applied to it in any ordinary or usual manner, and the difficulty existing in the previous construction is wholly avoided and this desirable class of handle made practical for general use.

I have represented the head B of the socket as spherical and the handle of a U shape—that is, with its sides parallel and the connection between the sides semicircular. By U-shaped handle I wish to be understood as meaning a handle curved or shaped to bring its two ends into line at the ends of the tube; but these particular shapes are no part of my invention, and may be changed to suit the demands of the market.

I claim—

The herein-described drawer-pull, consisting of the socket by which the pull is secured to the drawer, a tube through its head, a U-shaped handle, its two ends resting against the corresponding ends of said tube, and a spindle through said tube, secured in the ends of said handle, substantially as described.

ELI J. BLACKHAM.

Witnesses:
CHARLES L. STOCKING,
E. L. BRONSON.